United States Patent [19]

Sunseri et al.

[11] Patent Number: 4,977,217
[45] Date of Patent: Dec. 11, 1990

[54] POLYESTERS HAVING IMPROVED IMPACT STRENGTH

[75] Inventors: Ronald H. Sunseri; Michael W. O'Rourke, both of Baton Rouge, La.

[73] Assignee: Copolymer Rubber & Chemical Corporation, Baton Rouge, La.

[21] Appl. No.: 214,861

[22] Filed: Jul. 1, 1988

Related U.S. Application Data

[60] Division of Ser. No. 105,455, Oct. 1, 1987, abandoned, which is a continuation of Ser. No. 800,333, Nov. 21, 1985, abandoned.

[51] Int. Cl.$^5$ ............................................. C08F 255/06
[52] U.S. Cl. ........................................ 525/286; 525/64
[58] Field of Search ...................... 525/64, 194, 286

[56] References Cited

U.S. PATENT DOCUMENTS

| | | | |
|---|---|---|---|
| 3,862,265 | 1/1975 | Steinkamp | 264/176 R |
| 3,868,433 | 2/1975 | Bartz | 156/327 |
| 3,886,227 | 5/1975 | Van Brederode | 525/286 |
| 3,953,541 | 4/1976 | Fuji | 525/286 |
| 4,026,967 | 5/1977 | Flexman | 525/286 |
| 4,172,859 | 10/1979 | Epstein | 428/402 |
| 4,558,096 | 12/1985 | Boon | 525/166 |

FOREIGN PATENT DOCUMENTS 60-040154 3/1985 Japan.
1208585 10/1970 United Kingdom.

*Primary Examiner*—Patricia Short
*Attorney, Agent, or Firm*—Rockey and Rifkin

[57] ABSTRACT

A polyester composition and method having improved unnotched Izod impact strength in which the polyester matrix is blended with an EPDM interpolymer grafted with an ester of acrylic or methacrylic acid and crosslinked with a diamine or diacid or its anhydride before or preferably after blending.

16 Claims, No Drawings

POLYESTERS HAVING IMPROVED IMPACT STRENGTH

This application is a division, of application Ser. No. 105,455, filed Oct. 1, 1987, now abandoned, which is a continuation of application Ser. No. 800,333, filed Nov. 21, 1985, now abandoned.

INTRODUCTION

This invention is an improvement of the invention described and claimed in the copending application of Olivier, Ser. No. 265,289, filed Oct. 26, 1988, which is a continuation of Ser. No. 858,890, filed Apr. 25, 1986, now abandoned, which is a continuation of Ser. No. 690,613 filed Jan. 11, 1985, now abandoned.

FIELD OF INVENTION

This invention relates to polyester polymeric materials and particularly polybutylene terephthalate having improved toughness and impact strength and to materials and methods for producing same.

DESCRIPTION OF PRIOR ART

As described in the aforementioned copending application, the utility of thermoplastic polyesters in engineering type applications is limited where toughness and high impact strength are required. Unmodified thermoplastic polyesters typically exhibit room temperature impact strength of 1 ft-lb/inch of notch or less on the Izod scale of impact strength.

Improvement of the toughness and impact strength of thermoplastic polyester has been the subject matter of considerable research and development by the most highly skilled in the art. Much of such earlier research and development has been addressed to the admixture of additives to the polyester, with particular attention being given to the addition of rubberlike or elastomeric materials, such as ethylene-propylene copolymers (EPM) or ethylene propylene-polyene terpolymers (EPDM), with a view towards improving impact strength and toughness without interfering with other of the desirable properties of the polyester. The desired level of improvement has not been achieved with the addition of such rubber-like or elastomeric materials by reason of the relative incompatibility between such rubber-like or elastomeric materials and polyester resins.

Attempts have been made to overcome this problem and increase the compatibility between the rubber-like or elastomeric materials and polyester resins by modification of the rubber-like or elastomeric materials to provide sites that enable the polyester or polycarbonate resins to adhere to the elastomeric materials.

Cope, in U.S. Pat. No. 3,435,093, discloses blends of polyethylene terephthalate and an ionic hydrocarbon copolymer of $\alpha$-olefins of the formula $R-CH=CH_2$ in which R is hydrogen (ethylene) or an alkyl radical of 1–3 carbon atoms (propylene-pentene) with the copolymer modified with an $\alpha,\beta$-ethylenically unsaturated carboxylic acid containing 3–5 carbon atoms. The Cope patent does not teach or suggest the components of the additive employed or the concepts employed in the practice of the invention described and claimed herein, as will hereinafter appear.

The problem was faced directly in the Epstein U.S. Pat. No. 4,172,859, issued Oct. 30, 1979. The Epstein patent is somewhat confusing in that it seeks to cover the waterfront by listing an endless number of materials and combinations thereof for use as additives to improve the toughness and impact strength of polyester and polycarbonate resins. In the Epstein patent, emphasis is placed on the importance of the particle size and tensile modulus of the copolymer additive. While Epstein contemplates the use of ethylenepropylene copolymers and ethylene-propylene-polyene terpolymers, from amongst the large number of other varieties of materials, and the use of $\alpha,\beta$-ethylenically unsaturated carboxylic and dicarboxylic acids and anhydrides as modifying agents to provide sites which adhere to the matrix resin, the Epstein patent does not recognize the concepts of the invention described and claimed as will hereinafter be pointed out.

In the aforementioned copending application, of which this is an improvement, the invention described therein is based on the thought that an ethylene, $C_3$–$C_{16}$ mono-olefin, polyene interpolymer and preferably an ethylene, propylene, diene rubbery interpolymer would make a good impact modifier for thermoplastic polyester, if the two could be made compatible. The two are relatively incompatible because the rubber is a hydrocarbon while the polyester is a much more polar substance. Thus, the objective of the invention described and claimed therein was addressed to the modification of the ethylene, mono-olefin, polyene interpolymer rubber greatly to improve its compatibility with polyester resins to provide an improved impact modifier for the thermoplastic polyester resin.

Briefly described, the features of the invention of the copending application are embodied in a composition comprising 60–90 percent by weight of a matrix resin in the form of a polyester blended with 10–40 percent by weight of an unsaturated rubber formed by copolymerization of ethylene—one or more mono-olefins and one or more polyenes in which the backbone rubber component has been modified with an ester of an $\alpha,\beta$-unsaturated acid having an epoxide functionality on the alkoxy portion, such as the ester derived from methacrylic acid and an epoxy alcohol and which attaches to the backbone rubber chiefly by way of a grafting reaction with little if any cross-linking reaction.

Polyesters and their method of manufacture are well known to the skilled in the art and are readily available in commerce. The invention was described therein with reference to polybutylene terephthalate as a preferred polyester such as marketed by the General Electric Plastics Company under the trademark Valox 310 and Valox 315, although others of the polyesters such as described in the above-mentioned Epstein U.S. Pat. No. 4,172,859 could be used in the practice of the described invention for their improvement in toughness and impact strength.

DESCRIPTION OF THE INVENTION

While an ethylene-propylene-polyene (EPDM) interpolymer which has been grafted with an epoxide functional ester of an $\alpha\beta$-unsaturated acid markedly improves the notched Izod impact strength of polybutylene terephthalate (PBT) resins, deficiencies have been found to exist with respect to the unnotched Izod impact strength at the knitline. It has been found, in accordance with the practice of this invention, that controlled cross-linking of the rubber backbone phase of the modifier (grafted EPDM) provides a significant improvement in the knitline strength of the PBT-modifier blend; (1) when a cross-linking reaction is carried out after proper dispersion of the grafted rubber in the plastic matrix and (2) when the cross-linking is limited primarily to the rubber phase of the blend. Under these conditions improvement in knitline strength can be achieved while still maintaining good notched Izod impact strength.

DETAILED DESCRIPTION OF THE INVENTION

Description will first be made of the preparation of the grafted backbone rubber. The backbone rubber is formed by interpolymerization of monomers of ethylene, one or more higher mono-olefins having from 3–16 carbon atoms, preferably propylene, plus one or more polyenes.

The polyene monomer containing a plurality of carbon-to-carbon double bonds may be selected from those disclosed in the prior art for use as third monomers in the preparation of ethylene-mono-olefin-polyene terpolymers, including open chain polyunsaturated hydrocarbons containing 4–20 carbon atoms, such as 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo (2,2,1) heptane wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged ring hydrocarbons include polyunsaturated derivatives of bicyclo(2,2,2) octane as represented by bicyclo(3,2,1) octane, polyunsaturated derivatives of bicyclo(3,3,1) nonane, and polyunsaturated derivatives of bicyclo(3,2,2) nonane.

Specific examples of preferred bridged ring compounds include 5-methylidene-2-norbornene, 5-ethylidene-2-norbornene, 5-n-propylidene-2-norbornene, 5-isobutylidene-2-norbornene, 5-n-butylidene-2-norbornene, 5-isobutylidene-2-norbornene, dicyclopentadienes; the methyl butenyl norbornenes such as 5-(2-methyl-2-butenyl)-2-norbornene or 5-(3-methyl-2-butenyl)-norbornene, and 5-(3,5-dimethyl-4-hexenyl)-2-norbornene. The elastomer prepared from 5-ethylidene-2-norbornene is much preferred as it has outstanding properties and produces many unusual and unexpected results.

The backbone rubber may contain chemically bound therein molar ratios of ethylene to propylene or other $C_3$-$C_{16}$ mono-olefin varying between 95:5 to 5:95 ethylene:propylene, and preferably between 70:30 to 55:45 ethylene propylene. The polyene or substituted polyene may be chemically bound therein in an amount of 0.1 to 10 mol percent, and preferably 0.3 to 1 mol percent, or in an amount to provide an actual unsaturation level of 2–15 double bonds per 1,000 carbon atoms in the polymer chain.

The interpolymerization reaction is carried out in the presence of a catalyst in a solvent medium. The polymerization solvent may be any suitable inert organic solvent that is liquid under reaction conditions. Examples of satisfactory hydrocarbon solvents include straight chain paraffins having from 5–8 carbon atoms, with best results often being secured by the use of hexane; aromatic hydrocarbons and preferably an aromatic hydrocarbon having a single benzene nucleus, such as benzene, toluene and the like; and saturated cyclic hydrocarbons having boiling point ranges approximating those of the straight chain paraffin hydrocarbons and aromatic hydrocarbons described above, and preferably saturated cyclic hydrocarbons having 5–6 carbon atoms in the ring nucleus. The solvent selected may be a mixture of one or more of the foregoing hydrocarbons and preferably a mixture of aliphatic and naphthenic hydrocarbons having approximately the same boiling range as normal hexane. It is desirable that the solvent be dry and free of substances that will interfere with the Ziegler type catalyst used in the polymerization reaction.

The interpolymerization is carried out in the presence of a Ziegler catalyst of the type well known in the prior art. Such Ziegler type catalysts are disclosed in a large number of patents, such as U.S. Pat. Nos. 2,933,480, 3,093,620, 3,093,621, 3,211,709 and 3,113,115. Examples of Ziegler catalysts include metal organic coordination catalysts prepared by contacting a compound of a heavy metal of the group IV-a, V-a, VI-a and VII-a of the Mendeleeff periodic system of elements, such as titanium, vanadium and chromium halides with an organo-metallic compound of a metal of groups I, II or III of the Mendeleeff periodic system which contains at least one carbon-metal bond, such as trialkyl aluminum, and allyl aluminum halides in which the alkyl groups contain from 1–20 and preferably 1–4 carbon atoms.

The preferred Ziegler catalyst for interpolymerization is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are especially preferred include alkyl aluminum chlorides of 3,113,115 having the general formula $R_1AlCl_2$ and $R_2AlCl$ and the corresponding sesquichlorides of the general formula $R_3Al_2Cl_3$, in which R is methyl, ethyl, propyl, butyl or isobutyl. In the catalyst system, the aluminum to vanadium mol ratio of the aluminum and vanadium compounds may be within the range of 5/1 to 200/1 and preferably within the range of 15/1 to 60/1, with best results being secured in the ratio of 40 aluminum to 1 vanadium. These same ratios apply with respect to corresponding compounds of others of the heavy metals substituted for the vanadium compound and the organo-metallic compounds of groups I, II and III for the aluminum compounds. A catalyst prepared from alkyl aluminum sesquichloride, such as the methyl or ethyl aluminum sesquichloride and vanadium oxychloride is preferred in the ratio of 1 mole vanadium oxychloride per 5–300 moles of aluminum and more preferably 15–60 moles of aluminum, with 40 moles of aluminum per mole of vanadium yielding the best results.

The polymerization is preferably carried out on a continuous basis in a reaction vessel closed to the outside atmosphere, which is provided with an agitator, cooling means and conduit means for continuously supplying the ingredients of the reaction including monomer, catalyst and accelerators and conduit means for continuously withdrawing solution containing elastomer, and the catalyst is killed by the addition of a catalyst deactivator.

The preparation of EPDM polymers is well known and is fully described in such patents as U.S. Pat Nos. 2,933,480, 3,093,621, 3,211,709, 3,646,168, 3,790,519, 3,884,993, 3,894,999 and 4,059,654, amongst many others.

There are a number of factors involved in the modification of the backbone rubber for optimum use as an impact strength improver of polyester resins It is desirable to effect modification of the backbone rubber with an agent which, when bound to the rubber, provides active sites in the form of epoxide functions. On the other hand, it is desirable to effect modification of the unsaturated backbone rubber with a modifying agent that involves little, if any, copolymerization or cross-linking, but instead relies chiefly on a grafting reaction for attachment to become a part of the backbone rubber. Too much cross-linking at this stage of the process of this invention prevents the satisfactory dispersion of the rubber into the polyester resin, which is required for notched Izod impact strength improvement and for subsequent cross-linking in the presence of the polyester resin. By the same token, it is desirable, in accordance with the practice of this invention, to carry out the modification of the backbone rubber using reactants and conditions which do not favor cross-linking under reaction conditions.

In these regards, the concepts described herein differ basically from the teaching of the aforementioned Epstein U.S. Pat. No. 4,192,859, which does not recognize the unique function of an epoxide modifier and which favors copolymerization as the mechanism for binding modifying agents with the base polymer. Further, the Epstein patent does not lead one skilled in the art to make use of an unsaturated ethylene, mono-olefin, polyene rubber and minimization of a cross-linking or other reaction that would involve unsaturated carbon-to-carbon linkages of the base polymer during the reaction to modify the base rubber.

As the ester of a methacrylic acid which has an epoxide functionality on the alkoxy portion, it is preferred to make use of glycidyl methacrylate, although other epoxy compounds having the following general formula may be used:

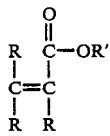

in which R' is an organic group having an epoxide functionality and R is hydrogen, methyl, ethyl, propyl or other alkyl, aralkyl, cyclic, or aromatic group. Representative of such other modifying agents are glycidyl acrylate, glycidyl 2-ethylacrylate, glycidyl 2-propylacrylate and the like.

The catalyst is one that favors grafting reaction as compared to a cross-linking reaction under the reaction conditions to combine the epoxide modifying agent with the unsaturated backbone rubber. For this purpose, it is preferred to make use of a free radical initiator such as a dialkyl peroxide. In the grafting reaction, use can be made of the catalyst in an amount within the range of 1-5 parts per 100 parts by weight of the unsaturated rubber, and preferably in an amount within the range of 1-2 percent by weight.

The level of graft of the epoxy modifying agent onto the unsaturated backbone rubber is somewhat dependent on the amount of unsaturation in the backbone rubber. It is desirable to make use of an ethylene, mono-olefin, polyene backbone rubber having at least 1.5 unsaturated carbon-to-carbon linkages per 100 carbon atoms and little additional benefit is derived from the use of an unsaturated backbone rubber having more than 20 carbon-to-carbon double bonds per 1000 carbon atoms. In the preferred practice of this invention, use is made of an unsaturated rubber having from 2-15 carbon-to carbon double bonds per 1000 carbon atoms or which provide for a level of graft within the range of 1-10 percent and preferably 1.5-4 percent by weight of the rubber.

The preparation of unsaturated rubbers having the described characteristics are fully described in U.S. Pat. No. 3,894,999 and others of the aforementioned EPDM patents. They are commercially available under the trade name EPsyn 70A (4.5 C=C per 1000C); EPsyn 55 (9.0 C=C per 1000C), etc. marketed by Copolymer Rubber and Chemical Corporation of Baton Rouge, Louisiana.

The grafting reaction is carried out in solvent solution with the unsaturated rubber present in a concentration which may range from 10–30 percent by weight, with constant stirring, at an elevated temperature within the range of 125°–200° C. for a time ranging from ½2 hours. The reaction condition can be varied depending somewhat upon the type and amount of catalyst and temperature conditions, as is well known to the skilled in the art.

Description will hereinafter be made of the features of this invention wherein improvements in the knitline strength of the polyester-rubber blend can be achieved without noticeable loss of notched Izod impact strength. It has been found that the desired improvement results when the grafted rubber phase has been dispersed in, at least a part of, or all of the plastic phase prior to reaction to effect a cross-linking reaction and when the cross-linking reaction is caused to take place through either residual unsaturation or residual epoxy groups in the dispersed rubber phase.

As the cross linking agent which favors cross-linking through residual unsaturation in the grafted rubber, it is preferred to make use of multifunctional molecules or compounds with functionalities capable of reaction with the grafted rubber. For this purpose, use can be made of diacids, dianhydrides and/or diamines such as hexamethylene diamine (HDA), melamine, benzophenone tetracarboxylic dianhydride, adipic acid, maleic acid or anhydride, or other polyfunctional epoxide reactive compounds.

The described improvement in knitline strength can be achieved when the grafted rubber moiety contains from 1.5-20 unsaturated carbon-to-carbon linkages per 1000 carbon atoms in the EPDM rubber component and preferably 2.0 to 15 carbon-to-carbon double bonds per 1000 carbon atoms. The amount of cross-linking agent introduced into the dispersion for reaction will depend somewhat on the amount of unsaturation in the base rubber and its degree of graft. Improvement is achieved when the cross-linking agent is reacted in an amount within the range of 0.4–5 parts per hundred parts by weight of the grafted rubber and preferably within the range of 0.5–3 parts per 100 parts by weight of the grafted rubber moiety. The level of the cross-linking agent is adjusted according to its molecular weight and the number of functional groups per molecule as is well known to those skilled in the art.

As previously pointed out, the cross-linking reaction is preferably carried out after the grafted rubber has been dispersed by blending with the matrix plastic or polyester resin. Improvement in knitline strength can also be obtained when the grafted rubber is cross-linked prior to blending with the polyester matrix resin or simultaneously with the blending of the grafted rubber with the polyester matrix resin. In cases of prior cross-linking of grafted rubber, however, the notched Izod impact strength of the blend was found to suffer.

The cross-linking reaction is preferably carried out in bulk, as by working the dispersion of grafted rubber in the plastic material in the presence of the cross-linking agent and at elevated temperature, such as in an extruder, Banbury, Brabender Plasticorder or the like. The temperature for carrying out the cross-linking reaction may range from 350°–500° F. and preferably within the range of 400°–500° F.

Having described the basic concepts of this invention, illustration will now be made by way of the following examples:

Example 1 - Preparation of grafted EPDM

The starting polymer is a 2.3 RSV EPDM having an ethylene/propylene molar ratio of 65/35 and having as the termonomer 5-ethylidene-2-norbornene, at a level of seven weight percent.

Three hundred grams of the starting rubber, 0.3 grams of Irganox 1076 commercial phenolic antioxidant (Ciba Geigy), and 1150 grams of hexane were charged to a one-gallon Hastelloy C reactor. The reactor was sealed, flushed with nitrogen, and heated to 155° C. Thirty grams (10 parts per 100 parts rubber) of glycidyl methacrylate in fifty grams of hexane was pressured into the reactor. This was followed by six grams (2 parts per 100 parts rubber) of dicumyl peroxide (Hercules Di-Cup T) in fifty grams of hexane. The solution was stirred at 500–600 rpm for one hour at 155° C. and 200–250 psig. After the reaction mixture cooled down, the product was recovered by precipitation in acetone followed by drying overnight at 75° C. under vacuum. Analysis of a purified sample of the product indicated 2.8 weight percent bound glycidyl methacrylate (GMA). The product had an RSV of 2.2 and a melt flow of 1.2 g/10 minutes The product was gel free.

Additional examples for preparation of suitable grafted EPDM rubbers which differ in molecular weight, as measured by viscosity, and the amount of unsaturation and with different grafting agents are given in the aforementioned copending Olivier application.

The procedure for blending the grafted EPDM (EPDM-g-GMA) with the polyester and for carrying out the cross-linking reaction was as follows:

Blends containing 20% of the EPDM-g-GMA and 80% polybutylene terephthalate plastic (PBT) (Valox 315 General Electric Company) were prepared using a specified number of extrusions through a 1" single-screw extruder (Killion) having a L/D ratio of 20/1. Temperatures used for extrusion were 450° F. in the barrel and 425° F. at the die; the screw speed was approximately 35 rpm. The extruded strands were air-cooled and pelletized, and then molded into standard Izod bars (5"×½"×⅛") using a plunger injection molder. The cavity temperature was maintained at 540° F., and the mold temperature at 200° F. The knitline impact samples were molded using a doublegated mold on a screw injection molder, operated with a nozzle temperature of 510° F., a mold temperature of 140° F., and a cycle time of 25 secs. The molded test specimens were stored in moisture-proof polyethylene bags for 16–24 hours before testing. Notched Izod impact strength was measured according to ASTM D256. Knitline impact strength was measured on unnotched double-gated samples, in a manner similar to ASTM D256.

Example 2 - Control

A composition containing 20 percent by weight EPsyn 55-g-2.8% GMA, an EPDM of Example 1 grafted to contain 2.8 percent bound glycidyl methacrylate, and 80 percent by weight Valox 315, a polybutylene terephthalate of the General Electric Company of Schnectady, New York, was blended for three passes according to the conditions described in the blending procedure.

The notched Izod impact strength measured 13.5 ft-lbs/inch and the knitline unnotched Izod impact (KLUNI) was 2.2 ft-lbs/inch.

Example 3

The EPsyn 55-g-2.8% GMA from Example 2 was mixed in a Brabender at 150° C. with 0.5 parts per hundred parts of rubber (phr) hexamethylene diamine (HDA) Twenty parts by weight of this material was then blended with eighty parts by weight Valox 315 by three passes in the extruder. The resulting modified PBT had a notched Izod of 12.6 ft-lbs/inch, and a KLUNI of 4.0 ft-lbs/inch.

Example 4

Same procedure as in Example 3, except that 1.25 phr of 1,6 HDA was used. Notched Izod measured at 1.5 ft-lbs/inch, and KLUNI at 6.9 ft-lbs/inch.

Example 5

A blend of 20 parts of the EPsyn 55-g 2.8% GMA of Example 1 in 80 parts by weight Valox 315 was prepared by two passes through the extruder This blend was then added to the Brabender Plasticorder and mixed with 0.5 phr, 1,6 HDA. The notched Izod measured at 14.7 ft-lbs/inch, and the KLUNI rose to 18.0 ft-lbs/inch.

Example 6

Same procedure as in Example 5, except 0.5 phr 1,6 HDA was mixed with the blend in the extruder instead of the Plasticorder. Notched Izod measured at 13.6 ft-lbs/inch, and KLUNI at 16.4 ft-lbs/inch.

Example 7

Same procedure as in Example 6, but 0.36 phr melamine was used as the cross-linking agent instead of the HDA. The notched Izod measured at 13.6 ft lbs/inch, and the KLUNI at 15.7 ft-lbs/inch.

Example 8

Same procedure as in Example 6, but 1.39 phr Benzophenone tetracarboxylic dianhydride (BTDA) was used instead of the 1,6 HDA as the cross-linking agent Notched Izod measured at 13.8 ft-lbs/inch and KLUNI at 18.1 ft-lbs/inch.

Example 9

Same procedure as in Example 6, but 1.44 phr adipic acid was used instead of the HDA. Notched Izod measured at 13.5 ft-lbs/inch, and KLUNI at 15.5 ft-lbs/inch.

Example 10

Same procedure as in the control, but 0.8 phr of 2,5-dimethyl-2,5-di(t-butylperoxy) hexane (DBPH) was used as the cross-linking agent. Notched Izod measured at 0.87 ft-lbs/inch, and KLUNI at 7.4 ft-lbs/inch.

Example 11

Same procedure as Example 6, but 1.6 phr of DBPH was used as the cross-linking agent instead of the 1,6 HDA. Notched Izod measured at 12.7 ft-lbs/inch, and KLUNI at 4.5 ft-lbs/inch.

Example 12

Same procedure as in the control, but the modifier was 17.5% EPsyn 55-g-2.8% GMA and 2.5% EP-g-2.6% maleic anhydride (MAH), an ethylene-propylene copolymer grafted to contain 2.6% bound maleic-anhydride. (This anhydride functionality was used to provide "rubber-bound cross-linking sites.") Notched Izod measured at 2.1 ft-lbs/inch, and KLUNI at 11.8 ft-lbs/inch.

Example 13

Same procedure as in Example 6. However, the modifier was 17.5% EPsyn-55-g-2.8% GMA, and was blended with Valox 315 PBT for two passes in the extruder. Subsequently 2.5% EP-g-2.6%MAH was added and two more passes were made. Notched Izod measured at 12.1 ft-lbs/inch, and KLUNI at 11.9 ft-lbs/inch.

The conditions of preparation and pertinent blend properties of Examples 2-13 are summarized in Table I below.

TABLE I

| Example | Equipment[1] Used | Crosslinking Agent | Level (phr) | Timing[7] | NI[8] | KLUNI[9] |
|---|---|---|---|---|---|---|
| 2 | BB | None | — | — | 13.5 | 2.2 |
| 3 | BB | HDA[2] | 0.5 | Before | 12.6 | 4.0 |
| 4 | BB | HDA | 1.25 | Before | 1.5 | 6.9 |
| 5 | BB | HDA | 0.5 | After | 14.7 | 18.0 |
| 6 | Extr. | HDA | 0.5 | After | 13.6 | 16.4 |
| 7 | Extr. | Melamine | 0.36 | After | 13.6 | 15.7 |
| 8 | Extr. | BTDA[3] | 1.39 | After | 13.8 | 18.1 |
| 9 | Extr. | AA[4] | 1.44 | After | 13.5 | 15.5 |
| 10 | BB | DBPH[5] | 0.8 | Before | 0.87 | 7.4 |
| 11 | Extr. | DBPH | 1.6 | After | 12.7 | 4.5 |
| 12 | BB | EPM-g-MAH[6] | 14.3 | Before | 2.1 | 11.8 |
| 13 | Extr. | EPM-g-MAH | 14.3 | After | 12.1 | 11.9 |

(1) BB=Brabender Plasticorder; Extr.=Single Screw extruder.
(2) HDA=1,6 Hexane diamine.
(3) BTDA=Benzophenone tetracarboxylic dianhydride.
(4) AA=Adipic acid.
(5) DEPH=2,5-dimethyl-2,5-di(t-butylperoxy) hexane.
(6) EPM-g-MAH=Ethylene propylene copolymer grafted to contain 2.6% bound maleic anhydride.
(7) Order of addition of cross-linking agent relative to dispersing the modifier in the polyester.
(8) Notched Izod impact strength, ft.-lbs/inch.
(9) Knitline unnotched Izod impact strength, ft.-lbs./inch.

A comparison of the knitline unnotched impact strength of Example 2, having no cross-linking agent, and those of Examples 3-13, containing a cross-linking agent, clearly demonstrates an improvement in knitline strength achieved by cross-linking the modifier phase It will be noted that, although improvement in knitline strength is realized in all cases where a cross-linking agent is used, the improvement proceeds without deterioration of notched Izod impact strength, when the cross-linking agent is added to a blend containing the predispersed modifier. Furthermore, the examples demonstrate the utility of diamines (Examples 3-6), triamines (Example 7), dianhydrides (Example 8), diacid (Example 9), peroxides (Examples 10, 11) and polymers (Examples 12, 13) as cross-linking agents for the modified polyester blends of this invention.

As described in the aforementioned Olivier application, when the EPDM rubber is grafted with an epoxy functional ester of acrylic acid, optimum results are incapable of being achieved, perhaps because of excess cross-linking taking place during the grafting reaction whereby the grafted rubber becomes a poor modifier for polyester resins. It is disclosed in the aforementioned Olivier application that this deficiency can be overcome somewhat by minimizing the amount of cross-linking during the grafting reaction thereby to enhance the use of a glycidyl acrylate or other acrylate having an epoxide functionality in modifying the backbone rubber for use as a modifier for polyester resins It is disclosed in the aforementioned Olivier application that this can be achieved by carrying out the grafting reaction in the presence of an additional component that acts to inhibit cross-linking with the graft monomer during the grafting process as by the inclusion of, for example, methyl methacrylate as an additional monomer during grafting the unsaturated rubber with glycidyl acrylate. Such acrylate modified backbone rubbers are also suitable for post dispersion reaction with a cross-linking agent in accordance with the practice of this invention as illustrated by the following examples.

Example 14

The base rubber of Example 1 was grafted with 5 parts glycidyl acrylate, 5 parts methyl methacrylate, and 2 parts dicumyl peroxide per 100 parts rubber in the manner of Example 1. Analysis of a purified sample of the product indicated a degree of grafting of 2.0% GA. No analysis for bound methyl methacrylate was made. The product had an RSV of 2.5 and a melt flow of 0.5 g/10 minutes. The product was gel free.

Example 15

A blend is prepared in the manner and composition of Example 5, except that the grafted rubber of Example 14 is used in place of the grafted rubber of Example 1.

We claim:
1. The product for blending with a polyester resinous material to improve its unnotched Izod impact Strength at the knit-line and to improve the notched Izod impact strength of the polyester comprising an interpolymer of ethylene, mono-olefin having 3-16 carbon atoms and a polyene, in which the interpolymer is grafted with an ester of methacrylic acid or acrylic acid having an epoxide functionality on the alkoxy portion and in which the previously grafted interpolymer is reacted with a multifunctional compound selected from the group consisting of a diamine and a diacid or its anhydride to provide a cross-linking limited primarily to the rubber phase.

2. The product as claimed in claim 1, in which the mono-olefin is propylene.

3. The product as claimed in claim 1, in which the polyene is 5-ethylidene-2-norborene.

4. The product as claimed in claim 1, in which the ester of methacrylic acid is glycidyl methacrylate.

5. The product of claim 1, in which the cross-linking agent is hexamethylene diamine.

6. The product of claim 1, in which the amount of unsaturation in the interpolymer is within the range of 1.5-20 carbon-to-carbon double bonds per 1000 carbon atoms.

7. The product as claimed in claim 1, in which the amount of cross-linking agent is within the range of 0.4-5 parts per 100 parts of grafted interpolymer.

8. The product as claimed in claim 1, in which the amount of cross-linking agent is within the range of 0.5-3 parts per 100 parts of grafted interpolymer.

9. The product as claimed in claim 1, in which the level of graft is within the range of 1-10 percent by weight of the interpolymer.

10. The product as claimed in claim 1, in which the level of graft is within the range of 1.5-4 percent by weight of the interpolymer.

11. The method for producing a modifying agent to improve the unnotched Izod impact strength at the knit-line and the Izod impact strength of polyester matrix resins comprising interpolymerizing ethylene, a mono-olefin having from 3-16 carbon atoms and a polyene to form a backbone rubber, grafting the backbone rubber with an ester of methacrylic acid or acrylic acid having an epoxide functionality on the alkoxy portion to a level of 1.5-20 percent by weight of the rubber, and then reacting the grafted rubber with a compound selected from the group consisting of a diamine or a diacid or its anhydride to provide a cross-linking limited primarily to the rubber phase.

12. The method as claimed in claim 11, in which the mono-olefin is propylene.

13. The method as claimed in claim 11, in which the polyene is 5-ethylidene-2-norbornene.

14. The method as claimed in claim 11, in which the ester of acrylic acid is glycidyl acrylate and wherein the grafting reaction is carried out in the presence of an unsaturated monomer which suppresses undesired cross-linking during the grafting.

15. The method as claimed in claim 11, in which the unsaturated monomer is glycidyl methacrylate.

16. The method as claimed in claim 11, in which the cross-linking agent is hexamethylene diamine.

* * * * *